United States Patent [19]

Tagiasco

[11] Patent Number: 4,586,297
[45] Date of Patent: May 6, 1986

[54] AGRICULTURAL GREENHOUSE WITH A FLAT ROOF

[75] Inventor: Jean P. Tagiasco, Noves, France

[73] Assignee: J. T. Province S.A., Noves, France

[21] Appl. No.: 604,013

[22] Filed: Apr. 26, 1984

[30] Foreign Application Priority Data

Apr. 28, 1983 [FR] France .................................. 83 06996

[51] Int. Cl.⁴ .............................. A01G 9/24; E04B 7/16
[52] U.S. Cl. ............................................ 52/1; 47/17; 52/18; 52/66; 52/72
[58] Field of Search .................... 47/17; 52/72, 18, 66, 52/13, 537, 204, 64, 1; 350/259, 260, 261, 262, 263

[56] References Cited

U.S. PATENT DOCUMENTS

| | | | |
|---|---|---|---|
| 1,899,912 | 2/1933 | Masters | 52/537 |
| 2,958,259 | 11/1960 | Ewing | 350/263 |
| 4,143,492 | 3/1979 | Dunn | 52/18 |
| 4,312,157 | 1/1982 | Hertel | 52/66 |

FOREIGN PATENT DOCUMENTS 8100635  9/1982  Netherlands ........................... 47/17

Primary Examiner—John E. Murtagh
Attorney, Agent, or Firm—Brisebois & Kruger

[57] ABSTRACT

The invention concerns agriculture. It relates in particular to an agricultural greenhouse which comprises a metallic frame supporting transparent covering elements, wherein said covering elements are formed of panels made of transparent plastic material mounted flatwise and having undulations which are parallel to the metallic frame members, said undulations each having two asymmetrical slopes, with the greater slope being directed southward, the angle α between the greater slope and the horizontal being about 25° to 35°, and the angle β between the smaller slope of each undulation and the horizontal being about 55° to 65°, and at least one of said covering elements being mounted pivotally around a horizontal axis at its free edge directed southward, with control means being provided for causing said panel or panels of the movable covering to pivot at a predetermined angle.

8 Claims, 4 Drawing Figures

AGRICULTURAL GREENHOUSE WITH A FLAT ROOF

BACKGROUND OF THE INVENTION

The present invention concerns an agricultural greenhouse comprising a metallic frame which supports transparent covering means having asymmetrical slopes.

Such greenhouses are known, and the asymmetrical roof structure assures an optimum effect of sunlight by directing the greater slope southward. Roofs of this type are formed by glass panels which are supported by metallic structures. Despite its physical and optical qualities, such as solution has considerable drawbacks.

Glass panels are heavy, and their transportation, handling and putting into place are long and difficult operations. To attain tightness at the levels of the ridges and the gutters of such a roof, joints and sections of a complex and costly construction are needed, the setting up of which is delicate and takes a long time.

It has already been proposed to replace the glass panels by smooth panels of transparent plastic; but the rigidity of such panel is insufficient for an acceptable economic solution. Providing tight joints in such a case is even more difficult than in the case of glass panels.

On the other hand, when plastic panels are utilized which are made rigid by ribs or undulations, all the advantages of an asyymetrical structure with respect to optimum sunlight exposure are lost.

SUMMARY OF THE INVENTION

It is an object of the invention to provide an agricultural greenhouse which obviates the shortcomings of the known structures and which comprises a less costly covering that can be easily put into place, while retaining all the advantages inherent in an asymmetrical roof.

According to the present invention, said metallic frame comprises at least two supporting elements for the purpose of being disposed in east-west direction, and each of which is formed of two posts, interconnected by a supporting girder, with the upper ends of said supporting elements being interconnected by a plurality of girders, intended to receive covering means which are formed of panels made of transparent plastic material mounted flatwise and having undulations which are parallel to said supporting elements, said undulations each having two asymmetrical slopes, with the greater slope being directed southward, the angle $\alpha$ between the greater slope being about 25° to 35°, and the angle $\beta$ between the smaller slope of each undulation and the horizontal being about 55° to 65°, and at least one of said covering elements being mounted pivotably around a horizontal axis at its free edge which is directed southward, with control means being provided for causing said panel or panels of the movable covering to pivot at a predetermined angle.

The structure thus obtained is simple and of light weight. The undulated plastic covering means are sufficiently rigid to allow flat mounting. Due to their mechanical resistance and their low weight, they can be easily and rapidly handled and installed. The junction between two adjacent panels can be realized by simple covering without complex tightness joints.

The orientation and inclination of the slopes of undulation of the covering means are determined according to the invention in such a manner that in winter a maximum of light and heat is captured inside the greenhouse. During said period, the covering means extend in their vertical position and close the roof of the greenhouse according to the invention completely. It can be said that each undulation acts like the asymmetrical roof of a known glass greenhouse, and that the panels according to the invention retain all the advantages of an asymmetrical roof while being mounted flatwise without complex tightness joints.

In summer, the pivoting panels according to the invention are raised to allow ventilation to be effective inside the greenhouse. They are guided into a position in which they reflect a very large amount of the impinging sun rays. It is thus possible to maintain inside the greenhose a suitable temperature without ventilation.

According to a preferred embodiment of the invention, each supporting beam comprises a horizontal central section and two inclined end sections which are interconnected by brackets, with the upper ends of the posts being linked by a horizontal small beam, connected to the different sections of the supporting beam by brackets, whereas the free ends of the end sections are connected by brackets to said posts. In this manner, a lightweight structure of large extent is obtained which facilitates the work to be done inside the greenhouse.

Preferably, the unit of covering means is mounted pivotally, and the different panel units are actuated in synchronized fashion so that they are always inclined at the same angle relative to the horizontal, and said control means of the pivoting covering panels are actuated by a control mechanism which aims at guiding the covering panels at any given time into the inclined position which corresponds to the optimum reflection of the sun rays impinging upon the covering means.

Ventilation of the greenhouse according to the invention during summer is thus particularly efficient, and the covering panels are always positioned at optimum inclination to limit the passage of light and heat toward the inside of the greenhouse. This is particularly important when the greenhouse according to the invention is to be set up in a hot country with much sunshine.

According to a special embodiment of the greenhouse according to the invention, said actuating mechanism comprises a first photocell, fixedly mounted on the greenhouse, which gives a signal proportional to the angle of incidence of the sun rays. It is applied to a suitable forming circuit for producing a signal corresponding to the optimum inclination of the covering means; a second photocell provided on the control means of the pivoting elements, and which gives a signal proportional to the given inclination of said pivoting elements, with the output signals of the forming circuit and the second photocell being applied to a comparator circuit whose output signals control the movement in two opposite directions or the stopping of the control means of the pivoting covering elements.

Such an actuating device is of rather simple construction and may be in the form of all types of mechanical, pneumatic or hydraulic control means which can be utilized for moving the covering elements of the greenhouse according to the invention.

To facilitate the setting up of the structure and the putting in place of the covering means of the greenhouse according to the invention, said beams or girders which are used to support the covering means comprise at their upper surface, at predetermined distances, vertical rods for being engaged in fixing and positioning holes provided in the covering panels.

BRIEF DESCRIPTION OF THE DRAWINGS

Other embodiments and advantages become obvious by reading the following description in which reference is made to the accompanying drawings, in which.

DESCRIPTION OF THE PREFERRED EMBODIMENT

Figure 1:
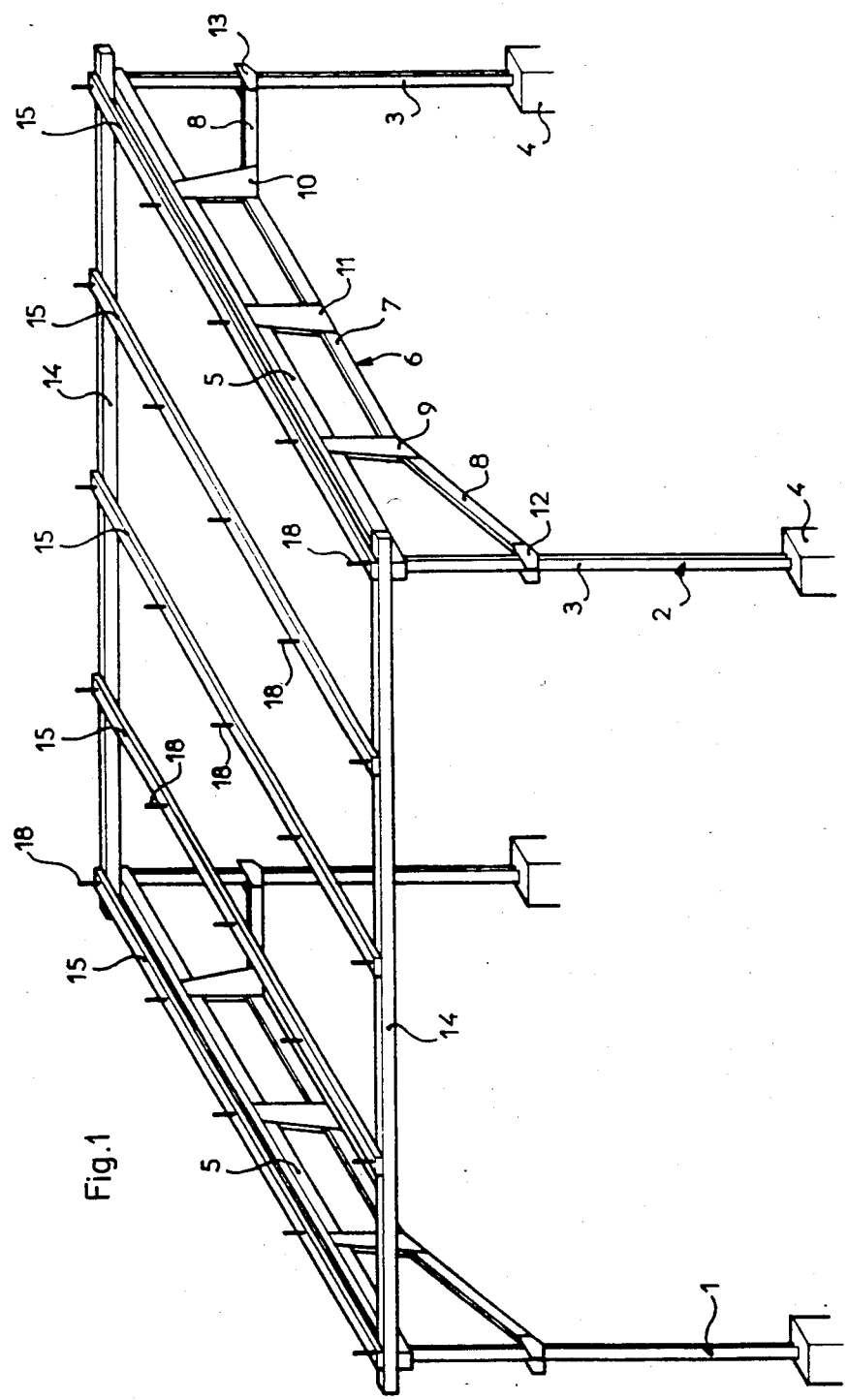
FIG. 1 is a schematic perspective view of the metallic frame of a greenhouse according to the invention prior to the putting in place of the covering elements.

The frame of the greenhouse according to the invention comprises at least two metallic frame members 1, 2 which are parallel and spaced from each other at a predetermined distance. These members are normally alined in east-west direction to allow north-south planting.

Each frame member 1, 2 comprises two steel posts 3 which are fixed to the ground in concrete blocks 4 or the like. The upper ends of the posts 3 are interconnected by a beam 5. This beam is reinforced by a girder having the general reference 6. Said girder 6 is formed of a central section 7 and two end sections 8. The central section 7 is in length substantially equal to twice the length of the end sections 8. It is connected with its two ends to the beam 5 by means of brackets 9 and 10 which also assure connection with the end sections 8.

On the median level of the central section 7 a complementary bracket 11 is provided.

The two end sections 8 of the distance girder 6 are fixed, on the one hand, to the central section 7 by the brackets 9 and 10, and, on the other hand, to the posts 3 by the brackets 12 and 13. The end sections 8 are inclined relative to the horizontal to reinforce conveniently the frame members 1, 2.

Figure 2:
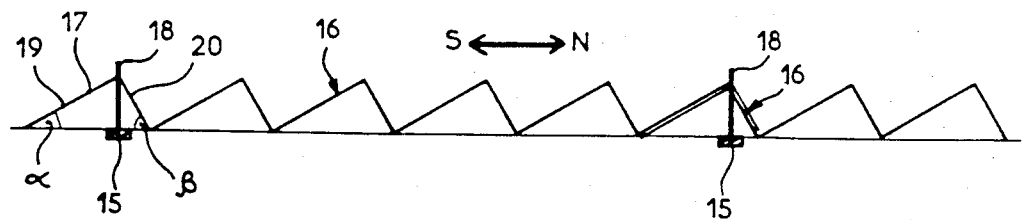
FIG. 2 is a vertical schematic section of two covering elements of the greenhouse according to the invention and of their fixing means.

The two frame members 1, 2 are interconnected by a plurality of girders 14 which lie on the beams 5. On the girders 14 a plurality of beams 15 are fixed which are parallel to the beams 5 and which are adapted to support the roof means 16 (FIG. 2). The spacing between the beams 5 is a function of the distance and the spacing of the roof means 16. Preferably, they comprise on their upper surface thin rods for attaching the roof means 16.

Said roof means 16 are in the form of flat panels 17 provided with regularly spaced undulations which extend in the direction of the beams 5 and 15. These panels 16 are made of a transparent plastic material, preferably a polyester. They have at predetermined distances rows of apertures for the passing through of the thin rods 18, provided on the beams 15. Their installation, positioning and attachment are thus easily and rapidly carried out.

According to the invention, the undulations 17 are asymmetrical and the panels 16 are set up in such a way that the greater slope 19, i.e. the least inclined, is directed southward as indicated in FIG. 2 by the double arrow NS. The angle $\alpha$ between the greater slope 19 and the horizontal is about 25° to 35° and preferably around 35°, whereas the angle $\beta$ between the small slope 20 of each undulation and the horizontal is about 55° to 65°, and preferably around 65°. The summits of the undulations can have a pointed angle (FIG. 2) or can be rounded (not shown).

Due to the orientation and inclination of the two slopes 19, 20 of the undulations 17 of the covering panels 16, optimum light penetration is attained in the greenhouse for a lighting therein under winter conditions. This effect is obtained with a clear sky, with a sky covered by light clouds and with a sky having dense cloud cover. This result in indispensable for obtaining sufficient lighting to allow the plants to grow without the use of artificial light sources. The light penetration also allows the improvement of thermic conditions inside the greenhouse according to the invention.

Contrary thereto, the orientation and inclination of the slopes of the undulations 17 of the panels according to the invention is relatively unfavorable for conditions prevailing in hot countries. To obviate this drawback, several or even all of the covering panels 16 of the greenhouse according to the invention can be mounted pivotally at their edge extending southward, as is shown in FIG. 3.

Figure 3:
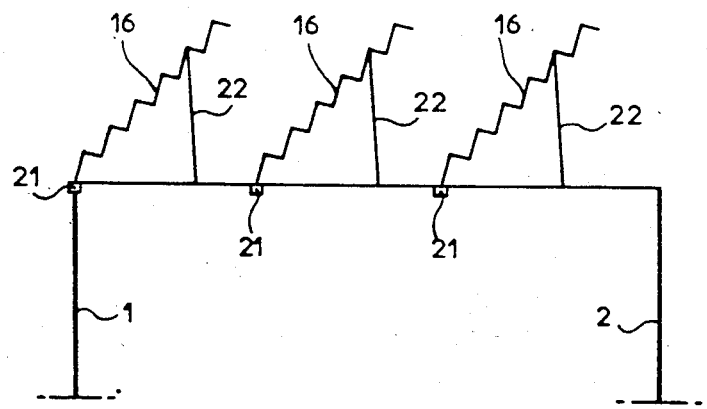
FIG. 3 is a transverse schematic view of a preferred embodiment of the greenhouse according to the invention.

The greenhouse shown in FIG. 3 comprises between two supporting frame members 1, 2, three undulated covering panels 16, mounted pivotally at their southwardly directed edge around a horizontal axis of rotation 21. The raising and lowering of the panels 16 can be controlled in a known manner (not shown here in detail) by rods 22, actuated by mechanical or hydraulic control means.

During summer, the panels 16 are raised at a predetermined inclination which allows good ventilation of the greenhouse and optimum reflection of sunlight. On the other hand, in winter the panels 17 are placed in their horizontal position for assuring optimum penetration of light into the greenhouse.

To improve the results during summer, the inclination of the panels 16 can be regulated during this period or even every day of said period as a function of the angle of incidence of the impingement of sun rays. For this purpose, known servo-mechanisms are used, for example, for the automatic orientation of sun light collectors.

Figure 4:
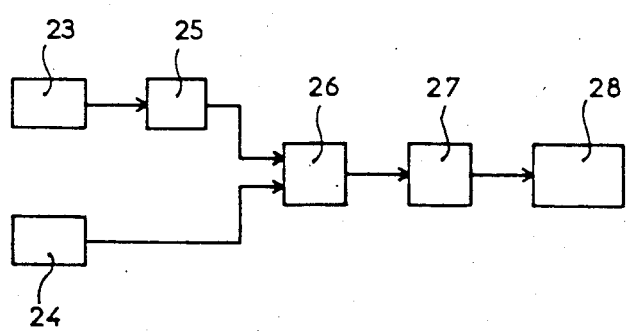
FIG. 4 shows a diagram of the actuating means of the motor or lifting jack which, in summer, control the raising of the covering elements shown in FIG. 3.

FIG. 4 shows by way of example a diagram of such an actuating device. This device comprises two photoelectric cells 23, 24, one of which, 23, is mounted on the greenhouse in a fixed, southward direction. The other cell, 24, is mounted on a panel of the movable cover. The output signal of the fixed cell 23 is applied to a calculating and forming circuit which supplies for each day of summer and as a function of the position of the sun, a signal which is proportional to the optimum inclination of the panels 16. The photocell 24 supplies a signal corresponding to the instantaneous inclination of the panel 16. The output signal of the cell 24 and of the forming circuit 25 are applied to the input of a comparator 26. When the two signals are different, the output of the comparator 26 supplies a control signal which, after having been formed in a circuit 27, is applied to the control means 28 of the rods 22. They thus control a raising or lowering of the panels 16. When the inclination of the panels reaches their optimum position determined by the circuit 25, the output signal of the comparator becomes 0, and the control means 28 are put out of operation.

The photocell 24 can also be mounted on the control means of the rods 22 and thus supply a signal proportional to a relatively instantaneous position of a part of said means. The function of the circuit 25 will in this case be determined as a function of the type of signal supplied by the photocell 24.

I claim:

1. Agricultural greenhouse of the type comprising a metallic frame supporting transparent covering elements which have asymmetrical slopes, wherein said frame comprises at least two frame members having upper ends arranged so as to be alined in east-west direction and each of which is in the form of two posts interconnected by a reinforcing girder, with the upper ends of said frame members being interconnected by a plurality of girders comprising means support said frame receiving said covering elements, formed as panels of transparent plastic material, mounted flatwise and having undulations, parallel to said frame members, said undulations each having two asymmetrical slopes of angle 2 and 3 the greater of which is directed southward, with the angle $\alpha$ between the greater slope and the horizontal being about 25° to 35°, and the angle $\beta$ between the smaller slope of each undulation and the horizontal being about 55° to 65°, and at least one of the covering elements is mounted pivotally around a horizontal axis at its free edge directed southward, with control means being provided for causing said movable covering panels to pivot by a predetermined angle.

2. Agricultural greenhouse according to claim 1, wherein each reinforcement girder comprises a central horizontal section and two inclined end sections interconnected by brackets, the upper ends of the posts being united by a horizontal beam connected to the sections of the reinforcement girder by brackets, said end sections having outer ends connected to said said posts by brackets.

3. Agricultural greenhouse according to claim 1 wherein a plurality of said covering elements are mounted for pivotal movement about a horizontal axis, and said plurality of covering elements are moved in synchronism to the same angle of inclination relative to horizontal.

4. Agricultural greenhouse according to claim 1 comprising actuating means for actuating said control means to move said covering elements to an inclined position which corresponds to optimum reflection of impinging sun rays on said covering elements.

5. Agricultural greenhouse according to claim 4 wherein said actuating means comprises, a first photo-cell mounted on said greenhouse for supplying a signal proportional to the angle of incidence of the sun rays, circuit means responsive to said signal from the photo-cell for generating a signal indicative of the optimum reflection inclination of said covering elements, a second photo-cell for supplying a signal proportional to the instantaneous inclination of the covering elements, and comparator means responsive to the output signals from said circuit means and said second photocell for generating an output signal for controlling the direction of movement of the pivotable covering elements to maintain said covering elements at optimum reflection inclination.

6. Agricultural greenhouse according to claim 1 wherein said covering element are comprised of polyester.

7. Agricultural greenhouse according to claim 1 wherein said covering elements are comprised of polyester.

8. Agricultural greenhouse according to claim 1 wherein said covering elements having a plurality of spaced apart positioning apertures formed therein, and said girders for supporting said covering elements have upwardly extending vertical rods extending into the positioning apertures of said covering elements.

* * * * *